US012286061B2

(12) United States Patent
Inagaki

(10) Patent No.: US 12,286,061 B2
(45) Date of Patent: Apr. 29, 2025

(54) OBJECT DETECTOR AND METHOD FOR OBJECT DETECTION

(71) Applicant: TOYOTA JIDOSHA KABUSHIKI KAISHA, Toyota (JP)

(72) Inventor: Kensuke Inagaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/507,237

(22) Filed: Nov. 13, 2023

(65) Prior Publication Data

US 2024/0227693 A1 Jul. 11, 2024

(30) Foreign Application Priority Data

Jan. 6, 2023 (JP) ................. 2023-000905

(51) Int. Cl.
B60R 11/04 (2006.01)
B60R 11/00 (2006.01)

(52) U.S. Cl.
CPC ......... B60R 11/04 (2013.01); B60R 2011/004 (2013.01); B60R 2300/406 (2013.01); B60R 2300/802 (2013.01); B60R 2300/8093 (2013.01)

(58) Field of Classification Search
CPC .......... G08G 1/16; G08G 1/161; G08G 1/162; G08G 1/163; G08G 1/164; G08G 1/165; G08G 1/166; G08G 1/167; G08G 1/168; G06T 2207/30256; G06T 2207/30261; G06T 2207/30264; G06V 20/56; G06V 20/58; G06V 20/582; G06V 20/584; G06V 20/586; G06V 20/588; G06V 2201/08; G06V 2201/07; H04W 4/46; H04W 4/48; B60R 2300/802; B60R 2300/8033; B60R 2300/806; B60R 2300/8093; B60W 30/18163; B60W 2556/45
USPC ....................................... 348/148
See application file for complete search history.

(56) References Cited

U.S. PATENT DOCUMENTS

2017/0287338 A1* 10/2017 Neubecker ............. G08G 1/167
2019/0256091 A1* 8/2019 Lepp ...................... G08G 1/143
2019/0304310 A1* 10/2019 Tao ........................ G08G 1/04
(Continued)

FOREIGN PATENT DOCUMENTS

WO 2019/106704 A1 6/2019
WO 2020/183892 A1 9/2020

Primary Examiner — Nathnael Aynalem
(74) Attorney, Agent, or Firm — Dickinson Wright, PLLC

(57) ABSTRACT

An object detector detects, for each of environmental sensors mounted on a vehicle, an object in an area around the vehicle from each piece of time-series environmental data generated by the environmental sensor; identifies a blind spot that is not represented in any of the pieces of environmental data respectively generated by the environmental sensors; selects, from the environmental sensors, an environmental sensor generating environmental data that can be omitted in detection of the object, based on a travel condition of the vehicle; requests blind spot data representing the blind spot from an external device equipped with an external sensor capable of generating the blind spot data; and stops detection of the object from environmental data generated by the selected environmental sensor and detects an object in the blind spot from obtained blind spot data, when the blind spot data is obtained from the external device.

5 Claims, 6 Drawing Sheets

(56) References Cited

U.S. PATENT DOCUMENTS

2020/0283024 A1 9/2020 Iwasaki
2022/0099457 A1 3/2022 Shibayama

\* cited by examiner

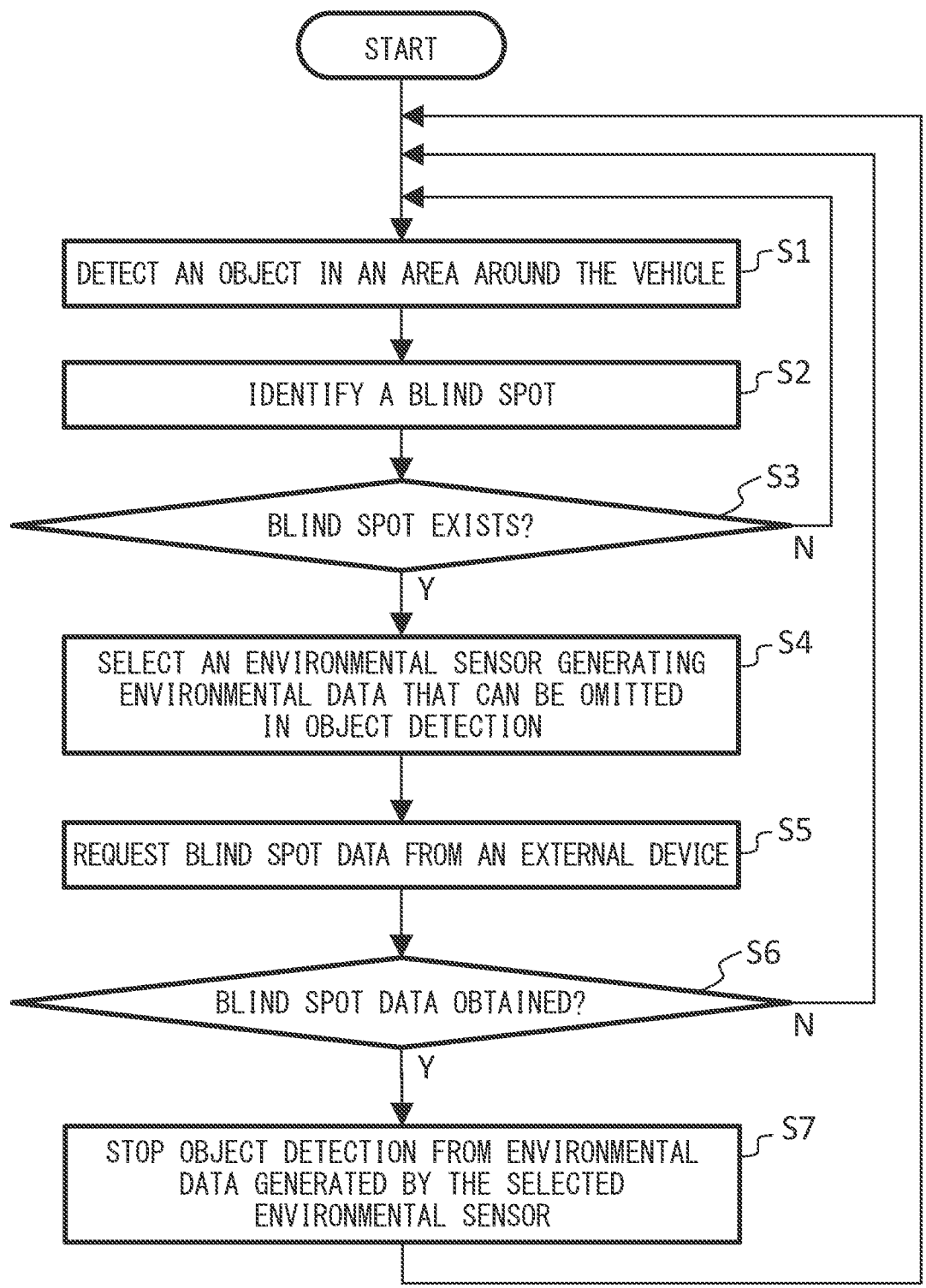

OBJECT DETECTOR AND METHOD FOR OBJECT DETECTION

FIELD

The present disclosure relates to an object detector and a method for detecting an object in an area around a vehicle.

BACKGROUND

A known object detector detects an object from environmental data representing the surroundings of a vehicle. A travel controller controls travel of the vehicle so that the distance to the detected object may not be less than a predetermined length.

A surrounding area around a vehicle may include a blind spot that is not represented in environmental data generated by an environmental sensor mounted on the vehicle. International Publication No. 2020/183892 describes a vehicle control system requesting information from an external device, such as another vehicle in a surrounding area, to complement information on a blind spot.

SUMMARY

In some cases, a vehicle does not have computational resources sufficient to execute a process to detect an object from environmental data generated by an environmental sensor mounted on the vehicle. In such a case, an object detector cannot detect an object appropriately from information on a blind spot obtained from an external device.

It is an object of the present disclosure to provide an object detector that can detect an object in an area around a vehicle appropriately.

The following is a summary of the present disclosure.

(1) An object detector comprising a processor configured to
  detect, for each of environmental sensors mounted on a vehicle, an object in an area around the vehicle from each piece of time-series environmental data generated by the environmental sensor, the environmental data representing the surroundings of the vehicle;
  identify a blind spot in the area around the vehicle, wherein the blind spot is not represented in any of pieces of environmental data respectively generated by the environmental sensors;
  select, from the environmental sensors, an environmental sensor generating environmental data that can be omitted in detection of the object, based on a travel condition of the vehicle;
  request blind spot data representing the blind spot from an external device equipped with an external sensor capable of generating the blind spot data, the external device being communicably connected to the vehicle; and
  stop detection of the object from environmental data generated by the selected environmental sensor, when the blind spot data is obtained from the external device,
  wherein in detection of the object, an object in the blind spot is detected from the obtained blind spot data when the blind spot data is obtained from the external device.

(2) The object detector according to (1), wherein in the request, the processor requests, from the external device, the blind spot data that does not have more pixels than the environmental data generated by the selected environmental sensor.

(3) The object detector according to (1) or (2), wherein in the identification, the processor further determines whether one of the environmental sensors has started to reveal the blind spot; and
  when one of the environmental sensors has started to reveal the blind spot, the processor finishes requesting the blind spot data from the external device, in the request, and
  restarts detection of the object from the environmental data generated by the selected environmental sensor, in the stopping.

(4) A method for object detection, having an object detector that detects an object in an area around a vehicle execute a process comprising:
  detecting, for each of environmental sensors mounted on the vehicle, an object in the area around the vehicle from each piece of time-series environmental data generated by the environmental sensor, the environmental data representing the surroundings of the vehicle;
  identifying a blind spot in the area around the vehicle, wherein the blind spot is not represented in any of pieces of environmental data respectively generated by the environmental sensors;
  selecting, from the environmental sensors, an environmental sensor generating environmental data that can be omitted in detection of the object, based on a travel condition of the vehicle;
  requesting blind spot data representing the blind spot from an external device equipped with an external sensor capable of generating the blind spot data, the external device being communicably connected to the vehicle; and
  stopping detection of the object from environmental data generated by the selected environmental sensor, when the blind spot data is obtained from the external device,
  wherein in detection of the object, an object in the blind spot is detected from the obtained blind spot data when the blind spot data is obtained from the external device.

(5) A non-transitory computer-readable medium storing a computer program for object detection, the computer program causing a computer mounted on a vehicle to execute a process comprising:
  detecting, for each of environmental sensors mounted on the vehicle, an object in an area around the vehicle from each piece of time-series environmental data generated by the environmental sensor, the environmental data representing the surroundings of the vehicle;
  identifying a blind spot in the area around the vehicle, wherein the blind spot is not represented in any of pieces of environmental data respectively generated by the environmental sensors;
  selecting, from the environmental sensors, an environmental sensor generating environmental data that can be omitted in detection of the object, based on a travel condition of the vehicle;
  requesting blind spot data representing the blind spot from an external device equipped with an external sensor capable of generating the blind spot data, the external device being communicably connected to the vehicle; and
  stopping detection of the object from environmental data generated by the selected environmental sensor, when the blind spot data is obtained from the external device,
  wherein in detection of the object, an object in the blind spot is detected from the obtained blind spot data when the blind spot data is obtained from the external device.

The object detector according to the present disclosure can detect an object in an area around the vehicle appropriately.

BRIEF DESCRIPTION OF DRAWINGS

FIG. 6 is a flowchart of an object detection process.

DESCRIPTION OF EMBODIMENTS

An object detector that can detect an object in an area around a vehicle appropriately will now be described in detail with reference to the attached drawings. For each of environmental sensors mounted on a vehicle, the object detector detects an object in an area around the vehicle from each piece of time-series environmental data generated by the sensor and representing the surroundings of the vehicle. Further, the object detector identifies a blind spot in the area around the vehicle; the blind spot is not represented in any of pieces of environmental data respectively generated by the environmental sensors. From the environmental sensors, the object detector selects an environmental sensor generating environmental data that can be omitted in detection of the object, based on a travel condition of the vehicle. The object detector requests blind spot data representing the identified blind spot from an external device equipped with an external sensor capable of generating the blind spot data and communicating with the vehicle via a communication network. When the blind spot data is obtained from the external device, the object detector stops detection of the object from environmental data generated by the selected environmental sensor and detects an object in the blind spot from the obtained blind spot data.

Figure 1:
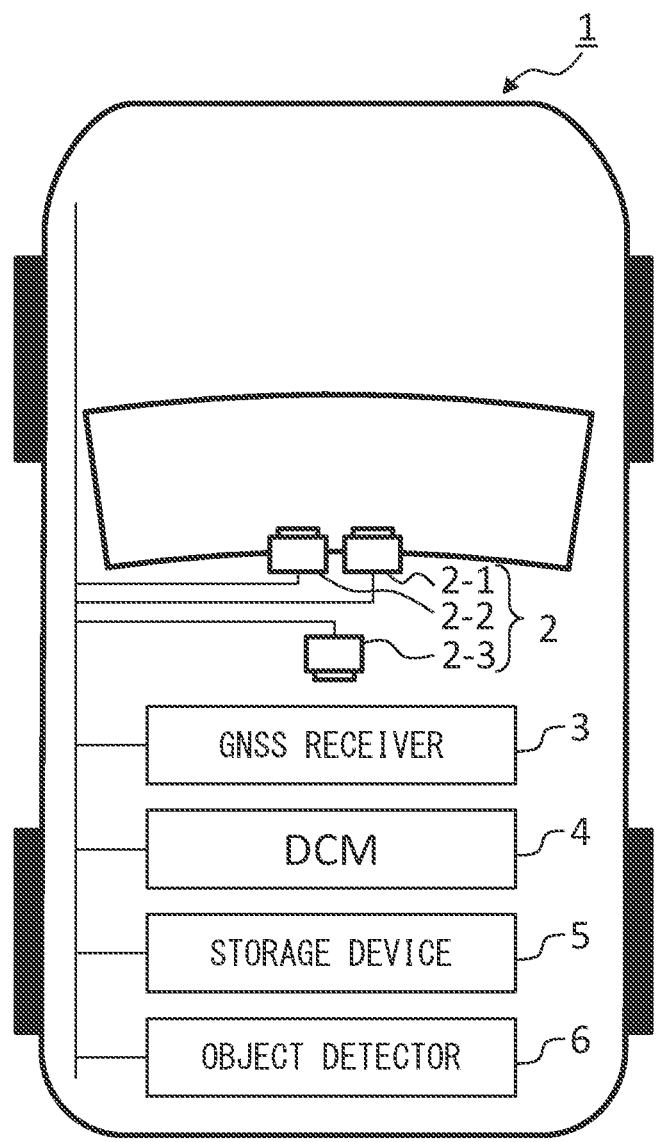
FIG. 1 schematically illustrates the configuration of a vehicle equipped with an object detector.

FIG. 1 schematically illustrates the configuration of a vehicle equipped with the object detector.

The vehicle 1 includes environmental cameras 2, a global navigation satellite system (GNSS) receiver 3, a data communication module (DCM) 4, a storage device 5, and an object detector 6. The environmental cameras 2, the GNSS receiver 3, the data communication module 4, and the storage device 5 are communicably connected to the object detector 6 via an in-vehicle network conforming to a standard such as a controller area network.

The environmental cameras 2 are an example of the environmental sensors for generating environmental data representing the surroundings of the vehicle 1. The environmental cameras 2 each include a two-dimensional detector constructed from an array of optoelectronic transducers, such as CCD or C-MOS, having sensitivity to visible light and a focusing optical system that forms an image of a target region on the two-dimensional detector.

The environmental cameras 2 include a first front environmental camera 2-1, a second front environmental camera 2-2, and a rear environmental camera 2-3. The first front environmental camera 2-1 and the second front environmental camera 2-2 are disposed, for example, in a front upper area in the vehicle interior and oriented forward whereas the rear environmental camera 2-3 is disposed, for example, in a rear upper area in the vehicle interior and oriented rearward.

The first front environmental camera 2-1, the second front environmental camera 2-2, and the rear environmental camera 2-3 each take pictures of the surroundings of the vehicle 1 through front and rear windshields every predetermined capturing period (e.g., 1/30 to 1/10 seconds). The first front environmental camera 2-1, the second front environmental camera 2-2, and the rear environmental camera 2-3 respectively output first front data, second front data, and rear data, which are time-series environmental data representing things in front and behind.

The angles of view of the first front environmental camera 2-1 and the rear environmental camera 2-3 are approximately 120 degrees. The angle of view of the first front environmental camera 2-1 may differ from that of the rear environmental camera 2-3. The angle of view of the second front environmental camera 2-2 is approximately 45 degrees.

The first front data outputted by the first front environmental camera 2-1 represents a large region ahead of the vehicle 1, and is used for travel control of the vehicle 1 in various situations. The second front data outputted by the second front environmental camera 2-2 represents a region relatively far from the vehicle 1 ahead of the vehicle 1, and is used, in particular, for travel control of the vehicle 1 traveling at a high speed. The rear data outputted by the rear environmental camera 2-3 represents a large region behind the vehicle 1, and is used for travel control of the vehicle 1 in various situations.

As an environmental sensor, the vehicle 1 may include a sensor other than the environmental cameras 2, e.g., a light detection and ranging (LiDAR) sensor that generates a range image whose pixels each have a value depending on the distance to an object represented in the pixel, based on the surroundings of the vehicle 1, as environmental data. As an environmental sensor, the vehicle 1 may also include an ultrasonic sensor that emits ultrasonic waves in predetermined directions, such as directions to the front right, front left, back right, and back left of the vehicle 1, and that measures distance from the time until the ultrasonic waves reflected by an object return.

The GNSS receiver 3 receives GNSS signals from GNSS satellites every predetermined period, and determines the position of the vehicle 1, based on the received GNSS signals. The GNSS receiver 3 outputs a positioning signal indicating the result of determination of the position of the vehicle 1 based on the GNSS signals to the object detector 6 via the in-vehicle network every predetermined period.

The data communication module 4, which is an example of a communication unit, is a device to execute a wireless communication process conforming to a wireless communication standard, e.g., Bluetooth Low Energy or V2X (Vehicle to X). For example, the data communication module 4 can operate as a broadcaster in communication of Bluetooth Low Energy, and transmit data received from the object detector 6 with the data included in an advertising packet. Further, the data communication module 4 can transmit data received from the object detector 6 with the data included in an uplink radio signal, and pass data included in a received radio signal to the object detector 6. The data communication module 4 may be mounted as part of the object detector 6. The data communication module 4 may further execute a wireless communication process conforming to a wide-area wireless communication standard, such as "4G (4$^{th}$ Generation)" or "5G (5$^{th}$ Generation)."

The storage device 5, which is an example of a storage unit, includes, for example, a hard disk drive or a nonvolatile semiconductor memory. The storage device 5 stores a high-precision map, which includes, for example, information indicating lane lines dividing lanes in a predetermined region represented in the high-precision map and information indicating parking lines dividing parking spaces in a parking area including parking spaces where vehicles can be parked.

The object detector 6 detects an object in an area around the vehicle, using environmental data generated by the environmental cameras 2 and blind spot data obtained via the data communication module 4.

Figure 2:
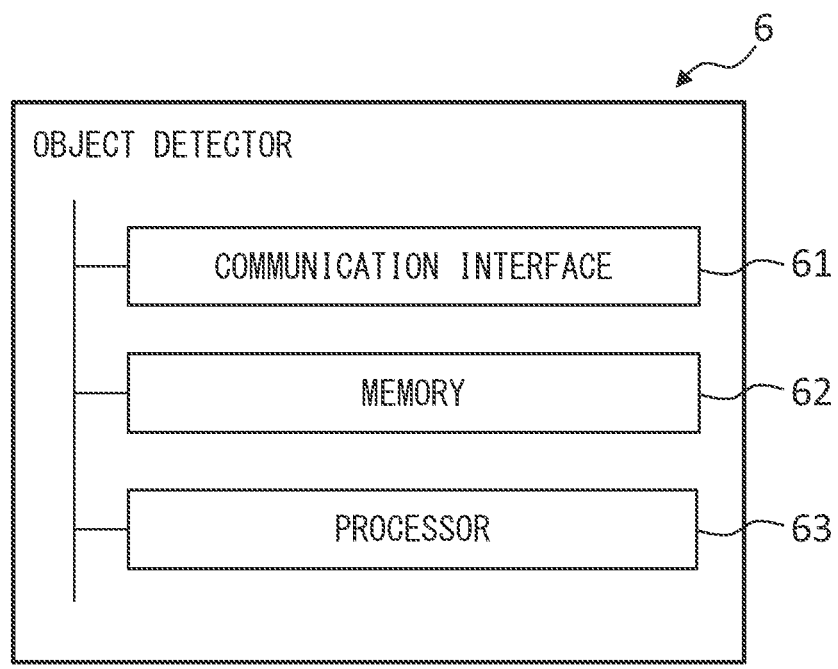
FIG. 2 schematically illustrates the hardware of the object detector.

FIG. 2 schematically illustrates the hardware of the object detector 6. The object detector 6 is an electronic control unit (ECU) including a communication interface 61, a memory 62, and a processor 63.

The communication interface 61, which is an example of a communication unit, includes a communication interface circuit for connecting the object detector 6 to the in-vehicle network. The communication interface 61 provides received data for the processor 63, and outputs data provided from the processor 63 to an external device.

The memory 62 includes volatile and nonvolatile semiconductor memories. The memory 62 stores various types of data used for processing by the processor 63, e.g., an environmental sensor selection rule for selecting an environmental sensor generating environmental data that can be omitted in object detection, based on a travel condition of the vehicle 1.

In the environmental sensor selection rule, a predetermined travel condition is associated with an environmental sensor, for example, when an object detected from environmental data generated by the environmental sensor in this travel condition is not a target for avoidance in travel control to avoid the vehicle 1 approaching the object. For example, when the speed of the vehicle 1 is not greater than 10 km/h, an object detected only from second front data generated by the second front environmental camera 2-2 is sufficiently away from the vehicle 1. Travel control to avoid approaching such an object can be easily executed even after detection of the object from first front data generated by the first front environmental camera 2-1. For this reason, a travel condition in which "the speed is not greater than 10 km/h" may be associated with the "second front environmental camera 2-2" in the environmental sensor selection rule. In the case where the speed of the vehicle 1 is not less than 80 km/h and where it is difficult to execute travel control to avoid approaching an object detected from first front data appropriately within a predetermined time, a travel condition in which "the speed is not less than 80 km/h" may be associated with the "first front environmental camera 2-1."

The memory 62 also stores various application programs, e.g., an object detection program for executing an object detection process.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 3:
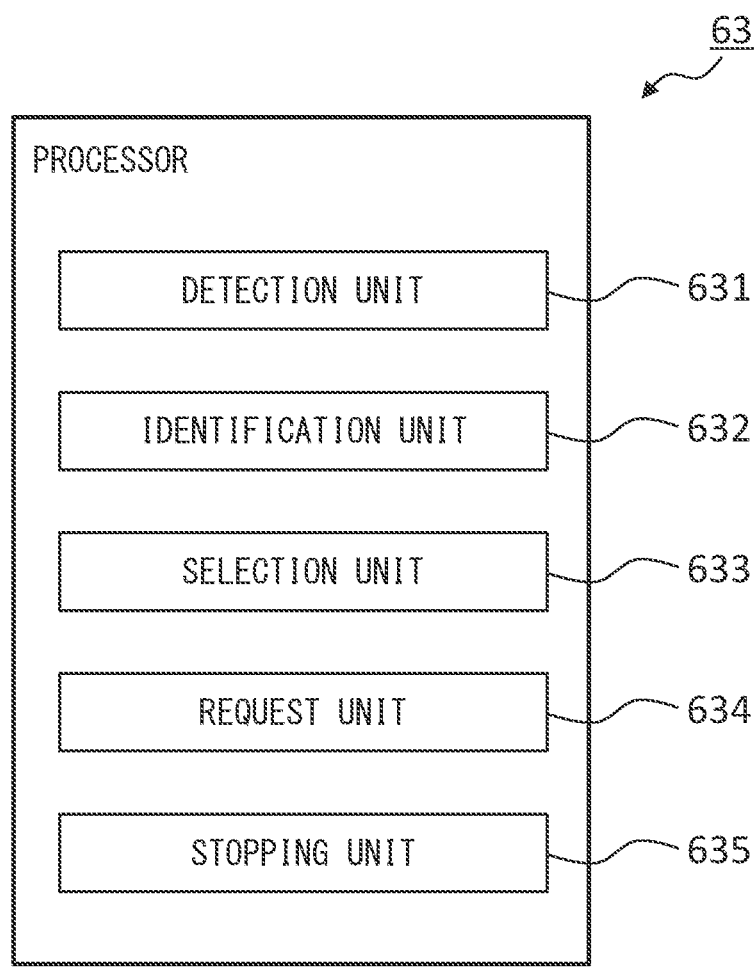
FIG. 3 is a functional block diagram of a processor included in the object detector.
Figure 4:
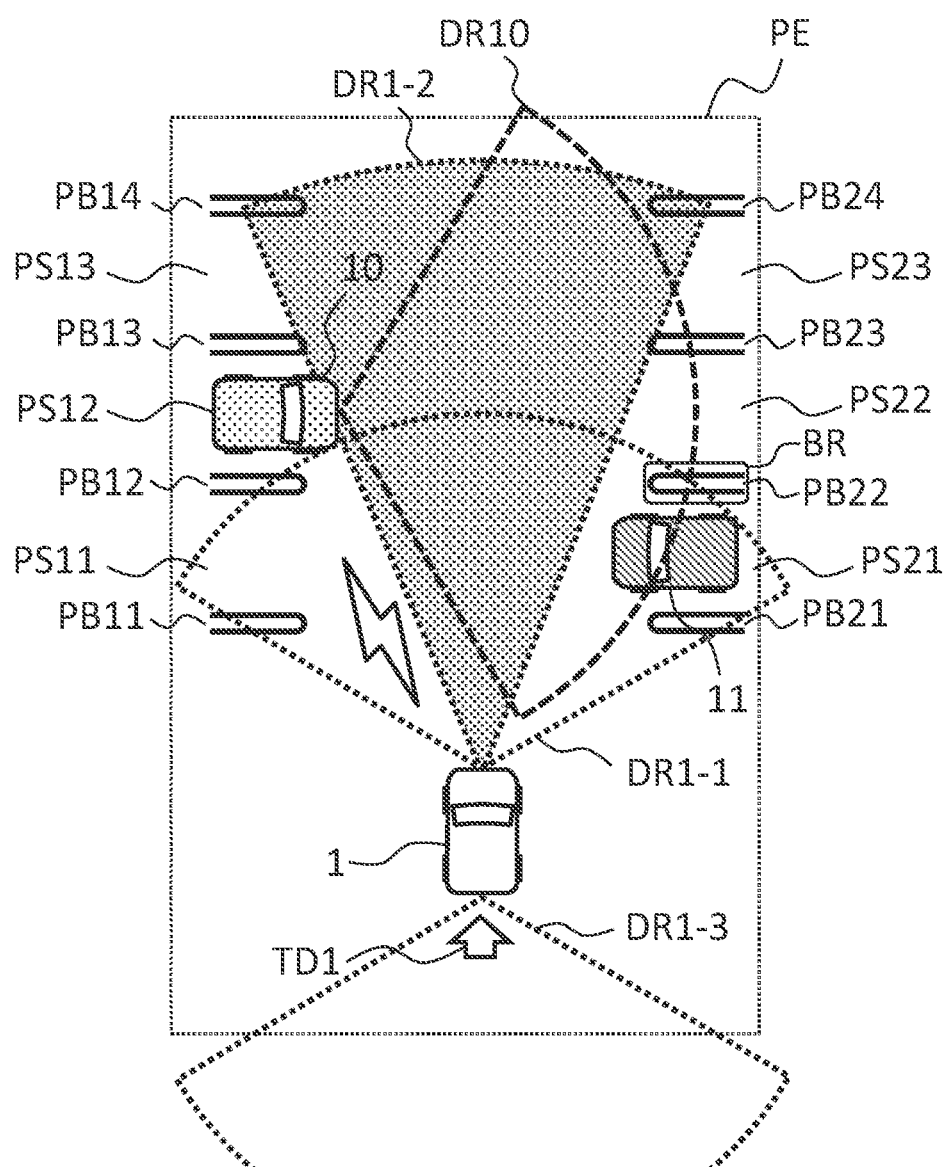
FIG. 4 is a schematic diagram for explaining a first example of object detection.
Figure 5:
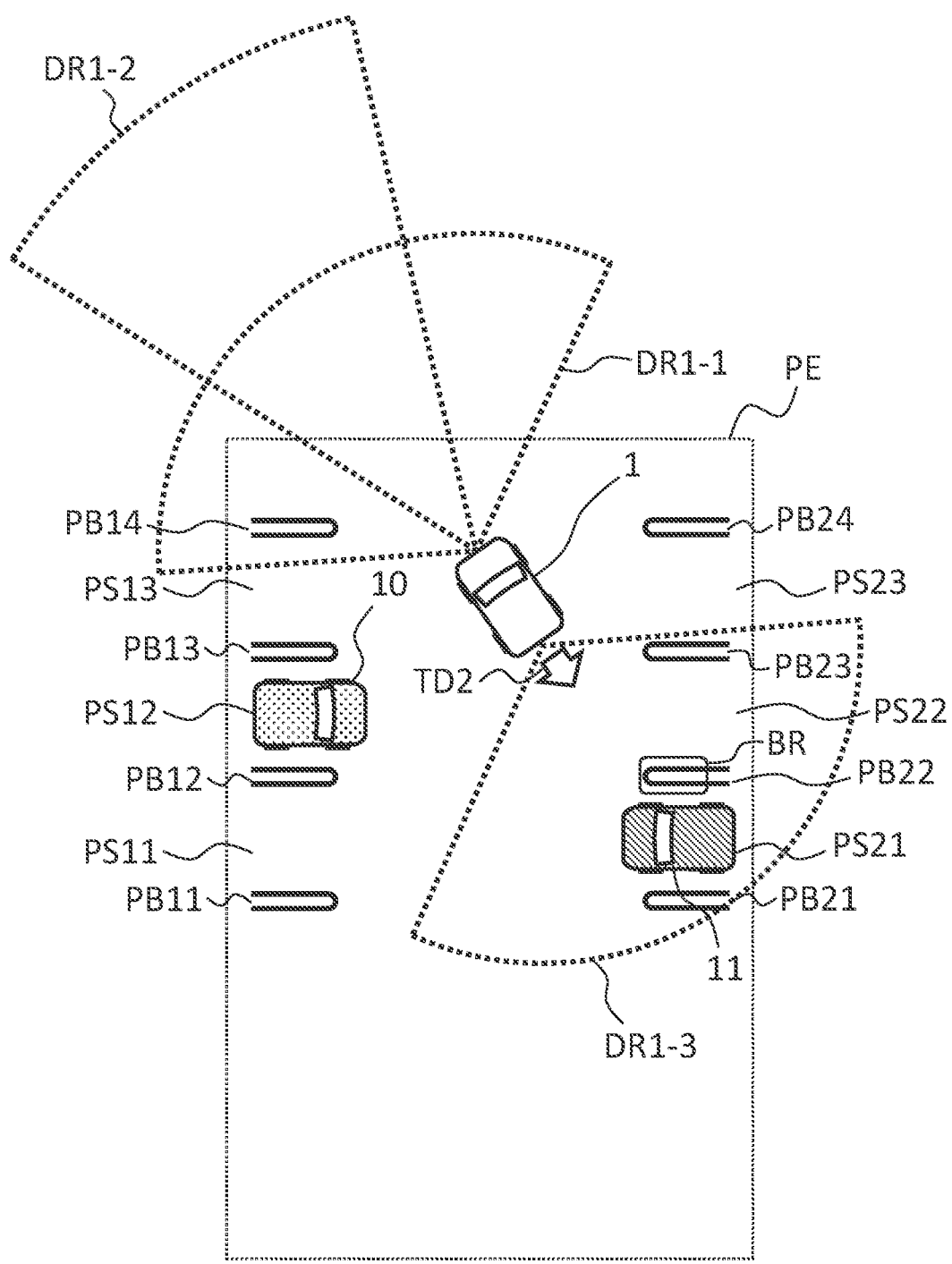
FIG. 5 is a schematic diagram for explaining a second example of object detection.

FIG. 3 is a functional block diagram of the processor 63 included in the object detector 6. FIGS. 4 and 5 are schematic diagrams for explaining first and second examples of object detection, respectively.

As its functional blocks, the processor 63 of the object detector 6 includes a detection unit 631, an identification unit 632, a selection unit 633, a request unit 634, and a stopping unit 635. These units included in the processor 63 are functional modules implemented by a computer program executed by the processor 63. The computer program for achieving the functions of the units of the processor 63 may be provided in a form recorded on a computer-readable portable storage medium, such as a semiconductor memory, a magnetic medium, or an optical medium. Alternatively, the units included in the processor 63 may be implemented in the object detector 6 as separate integrated circuits, microprocessors, or firmware.

The detection unit 631 obtains environmental data representing the surroundings of the vehicle 1 from the environmental cameras 2 (the first front environmental camera 2-1, the second front environmental camera 2-2, and the rear environmental camera 2-3) via the communication interface 61. For each environmental camera 2, the detection unit 631 detects an object in an area around the vehicle 1 from each piece of obtained time-series environmental data.

The detection unit 631 detects an object in an area around the vehicle 1 and its type by inputting each piece of time-series environmental data generated by the environmental cameras 2 into a classifier that has been trained to detect objects such as a vehicle and a pedestrian.

The classifier may be, for example, a convolutional neural network (CNN) including convolution layers connected in series from the input side toward the output side. A CNN that has been trained using a large amount of data including various types of objects, such as pedestrians and vehicles, as training data in accordance with a predetermined training technique, such as backpropagation, operates as a classifier that detects an object from data. Alternatively, a machine learning algorithm, such as a support vector machine (SVM) or AdaBoost, may be used for the classifier. In the case where the classifier is an SVM, the SVM is trained to determine support vectors for identifying whether an object is included regarding various regions in environmental data, and thereby operates as a classifier that detects an object.

The detection unit 631 may detect a feature in an area around the vehicle 1 by inputting received environmental data into a classifier that has been trained to detect features such as a signpost, a road marking, and a roadside tree. The classifier may be a CNN trained with training data including features. The detection unit 631 may detect a traffic participant and a feature from environmental data, using a CNN trained with training data including traffic participants and training data including features as a classifier.

The detection unit 631 estimates the direction of the object with respect to the vehicle 1, using the position of the region representing the object in the environmental data and capturing parameters stored in the memory 62, such as the focal lengths of the optical systems, capturing orientations, and pixel sizes of the environmental cameras 2. The detection unit 631 also estimates the distance from the vehicle 1 to the object, using the size of the region representing the object in the environmental data and a standard size of each type of object stored in the memory 62.

The detection unit 631 determines the position of the object detected from the environmental data in the world coordinate system, using the position and orientation of the vehicle 1, the direction of the object with respect to the vehicle 1, and the distance from the vehicle 1 to the object.

When blind spot data described below is obtained, the detection unit 631 detects an object in a blind spot from the obtained blind spot data. As will be described below, the blind spot data includes external sensor information on an external sensor that generated the blind spot data. The detection unit 631 can determine the coordinates in the world coordinate system of the object detected from the blind spot data, using the external sensor information.

Information on the object detected by the detection unit 631 can be used for autonomous driving control of the vehicle 1 executed by a travel controller (not illustrated) mounted on the vehicle 1.

The travel controller is an ECU including a communication interface, a memory, and a processor, and executes a computer program for travel control stored in the memory to execute a travel control process. The travel control process includes outputting a control signal to a travel mechanism (not illustrated), such as an engine or a motor, brakes, and steering of the vehicle 1, so that the distance from the vehicle 1 to the object in the area around the vehicle 1 may be an appropriate one. The travel controller and the object detector may be implemented on the same ECU.

The identification unit 632 identifies a blind spot in the area around the vehicle 1; the blind spot is not represented in any of pieces of environmental data respectively generated by the environmental sensors.

For example, the identification unit 632 compares features represented in a high-precision map obtained from the storage device 5 according to the position and orientation of the vehicle indicated by a positioning signal received from the GNSS receiver 3 with features detected from the pieces of environmental data. When one of the features represented in the high-precision map is not included in the features detected from the pieces of environmental data, the identification unit 632 identifies a predetermined area including the one of the features as a blind spot.

FIG. 4 illustrates the vehicle 1 traveling in a parking area PE. The parking area PE includes parking spaces PS11 to PS13 divided by parking lines PB11 to PB14 on the left with respect to a travel direction TD1 of the vehicle 1. The parking area PE also includes parking spaces PS21 to PS23 divided by parking lines PB21 to PB24 on the right with respect to the travel direction TD1 of the vehicle 1.

In the parking space PS12 is parked another vehicle 10. In the parking space PS21 is parked another vehicle 11. Regions DR1-1, DR1-2, and DR1-3 are regions around the vehicle 1 that are represented by first front data, second front data, and rear data outputted by the first front environmental camera 2-1, the second front environmental camera 2-2, and the rear environmental camera 2-3, respectively.

The parking line PB22 dividing the parking spaces PS21 and PS22 is included in the region DR1-1, and is not included in the region DR1-2 or DR1-3. Since the vehicle 11 parked in the parking space PS21 exists between the parking line PB22 and the first front environmental camera 2-1 included in the vehicle 1, the parking line PB22 is covered by the vehicle 11 and is not represented in the first front data outputted by the first front environmental camera 2-1.

The identification unit 632 identifies a predetermined area including the parking line PB22, which is not detected from the environmental data, as a blind spot BR. The predetermined area is, for example, within a predetermined distance (e.g., 50 cm) of the feature that is not detected from the environmental data.

The selection unit 633 selects, from the environmental sensors, an environmental sensor generating environmental data that can be omitted in detection of the object, based on a travel condition of the vehicle 1.

In the example of FIG. 4, the vehicle 1 is traveling in the parking area PE at a low speed (e.g., below 10 km/h). By referring to the environmental sensor selection rule stored in the memory 62, the selection unit 633 selects the second front environmental camera 2-2, which is associated with the travel condition of travel at a low speed, as the environmental sensor generating environmental data that can be omitted in detection of the object.

The request unit 634 requests blind spot data representing the identified blind spot from an external device equipped with an external sensor capable of generating the blind spot data; the external device is communicably connected to the vehicle 1.

In the example of FIG. 4, the vehicle 10 includes hardware whose configuration is similar to that of the vehicle 1. The object detector 6 included in the vehicle 1 is communicably connected to an object detector included in the vehicle 10 via the data communication module 4.

The request unit 634 transmits blind spot information for identifying the blind spot and a request for transmission of blind spot data to the object detector included in the vehicle 10. The blind spot information is, for example, the coordinates in the world coordinate system of the feature that is represented in the high-precision map and that is not detected from the environmental data as well as the lengths in the east-west direction and north-south direction of a rectangle centered at these coordinates. The blind spot information may be the coordinates in the world coordinate system of the feature that is represented in the high-precision map and that is not detected from the environmental data as well as the radius of a circle centered at these coordinates. At this stage, the request unit 634 does not need to know whether the external device which is a target for requesting blind spot data is equipped with an external sensor capable of generating blind spot data.

The object detector included in the vehicle 10 determines whether the blind spot identified by the received blind spot information is represented in external data generated by an external sensor mounted on the vehicle 10. When it is determined that the blind spot is represented in the external data, the object detector included in the vehicle 10 transmits the external data, as blind spot data, to the object detector 6 via a data communication module. The blind spot data includes the external data generated by the external sensor as well as external sensor information, such as the position and the orientation of the external sensor, the focal length of an optical system included in the external sensor, and the pixel size of imaging elements included in the external sensor.

At requesting blind spot data from the external device, the request unit 634 may request blind spot data that does not have more pixels than the environmental data generated by the environmental sensor selected by the selection unit 633 as the environmental sensor generating environmental data that can be omitted in detection of the object. The request of such blind spot data by the request unit 634 enables the processor 63 to appropriately detect an object from the blind spot data obtained from the external device.

The stopping unit 635 stops detection of the object from environmental data generated by the selected environmental sensor, when the blind spot data is obtained from the external device.

In the example of FIG. 4, when the blind spot data is obtained from the vehicle 10, the stopping unit 635 stops input of second front data generated by the selected second front environmental camera into the classifier to stop detection of an object from the second front data. The detection unit 631 inputs the blind spot data obtained from the vehicle 10 into the classifier to detect an object in the blind spot.

FIG. 5 illustrates the vehicle 1 traveling in the parking area PE, similarly to FIG. 4. In FIG. 5, the vehicle 1 is moving back after it moved in the travel direction TD1 and changed the travel direction to TD2. In FIG. 5, the parking line PB22, which was included in the blind spot BR in FIG. 4, is included in the region DR1-3 and is not covered by the vehicle 11, because the position and travel direction of the vehicle 1 have changed. In other words, the parking line PB22 is represented in rear data outputted by the rear environmental camera 2-3.

The identification unit 632 may determine whether one of the environmental sensors has started to reveal the blind spot. When one of the environmental sensors has started to reveal the blind spot, the request unit 634 finishes requesting the blind spot data from the external device, and the stopping unit 635 restarts detection of the object from the environmental data generated by the selected environmental sensor.

In the example of FIG. 5, the identification unit 632 determines that the blind spot has started to be represented in the rear data. In this case, the request unit 634 transmits a signal indicating a finish of requesting blind spot data to the object detector of the vehicle 10, and the stopping unit 635 restarts input of rear data into the classifier. The detection unit 631 inputs environmental data including the rear data into the classifier into to detect an object.

FIG. 6 is a flowchart of an object detection process. During travel of the vehicle 1, the processor 63 of the object detector 6 executes the object detection process described below.

First, the detection unit 631 of the processor 63 of the object detector 6 detects, for each environmental camera 2, an object in an area around the vehicle 1 from each piece of time-series environmental data generated by the environmental camera (step S1).

Next, the identification unit 632 of the processor 63 identifies a blind spot in the area around the vehicle 1; the blind spot is not represented in any of pieces of environmental data respectively generated by the environmental sensors (step S2).

The identification unit 632 determines the presence or absence of a blind spot (step S3). When there is not a blind spot (No in step S3), the process of the processor 63 returns to step S1, and the detection unit 631 repeats object detection, using the environmental data.

When there is a blind spot (Yes in step S3), the selection unit 633 of the processor 63 selects, from the environmental sensors, an environmental camera generating environmental data that can be omitted in detection of the object, based on a travel condition of the vehicle 1 (step S4).

Subsequently, the request unit 634 of the processor 63 requests blind spot data representing the blind spot from an external device equipped with an external sensor capable of generating the blind spot data; the external device is communicably connected to the vehicle 1 (step S5).

The request unit 634 determines whether blind spot data is obtained from the external device (step S6). When blind spot data is not obtained (No in step S6), the process of the processor 63 returns to step S1, and the detection unit 631 repeats object detection, using the environmental data.

When blind spot data is obtained (Yes in step S6), the stopping unit 635 of the processor 63 stops detection of the object from environmental data generated by the selected environmental camera (step S7). The process of the processor 63 returns to step S1, and the detection unit 631 detects an object in the blind spot from the obtained blind spot data.

Execution of such an object detection process enables detecting an object in an area around the vehicle appropriately.

According to a modified example, the object detector 6 and the vehicle 10 may be connected to a wireless base station (not illustrated) included in a communication network (not illustrated), and connected to each other via a server (not illustrated) connected to the communication network.

For example, the vehicle 10 transmits available data information indicating a region represented in external data generated by an external sensor mounted on the vehicle 10 to the server via the communication network repeatedly (e.g., at intervals of 1 minute). The object detector 6 transmits information indicating a blind spot to the server via the data communication module 4 and the communication network. The server identifies the vehicle 10 as an external device whose available data information indicates a region including the blind spot, and requests provision of external data from the vehicle 10. In response to the request from the server, the vehicle 10 generates external data with the external sensor, and transmits it to the server via the communication network. The server transmits the external data received from the vehicle 10 to the object detector 6 via the communication network.

Note that those skilled in the art can make various changes, substitutions, and modifications without departing from the spirit and scope of the present disclosure.

What is claimed is:

1. An object detector comprising a processor configured to detect, for each of environmental sensors mounted on a vehicle, an object in an area around the vehicle from each piece of time-series environmental data generated by the environmental sensor, the environmental data representing the surroundings of the vehicle;

identify a blind spot in the area around the vehicle, wherein the blind spot is not represented in any of pieces of environmental data respectively generated by the environmental sensors;

select, from the environmental sensors, an environmental sensor generating environmental data that can be omitted in detection of the object, based on a travel condition of the vehicle;

request blind spot data representing the blind spot from an external device equipped with an external sensor capable of generating the blind spot data, the external device being communicably connected to the vehicle; and stop detection of the object from environmental data generated by the selected environmental sensor, when the blind spot data is obtained from the external device, wherein in detection of the object, an object in the blind spot is detected from the obtained blind spot data when the blind spot data is obtained from the external device.

2. The object detector according to claim 1, wherein in the request, the processor requests, from the external device, the blind spot data that does not have more pixels than the environmental data generated by the selected environmental sensor.

3. The object detector according to claim 1, wherein in the identification, the processor further determines whether one of the environmental sensors has started to reveal the blind spot; and when one of the environmental sensors has started to reveal the blind spot, the processor finishes requesting the blind spot data from the external device, and restarts detection of the object from the environmental data generated by the selected environmental sensor.

4. A method for object detection, having an object detector that detects an object in an area around a vehicle execute a process comprising:

detecting, for each of environmental sensors mounted on the vehicle, an object in the area around the vehicle from each piece of time-series environmental data generated by the environmental sensor, the environmental data representing the surroundings of the vehicle;

identifying a blind spot in the area around the vehicle, wherein the blind spot is not represented in any of pieces of environmental data respectively generated by the environmental sensors;

selecting, from the environmental sensors, an environmental sensor generating environmental data that can be omitted in detection of the object, based on a travel condition of the vehicle;

requesting blind spot data representing the blind spot from an external device equipped with an external sensor capable of generating the blind spot data, the external device being communicably connected to the vehicle; and stopping detection of the object from environmental data generated by the selected environmental sensor, when the blind spot data is obtained from the external device, wherein in detection of the object, an object in the blind spot is detected from the obtained blind spot data when the blind spot data is obtained from the external device.

5. A non-transitory computer-readable medium storing a computer program for object detection, the computer program causing a computer mounted on a vehicle to execute a process comprising:

detecting, for each of environmental sensors mounted on the vehicle, an object in an area around the vehicle from each piece of time-series environmental data generated by the environmental sensor, the environmental data representing the surroundings of the vehicle;

identifying a blind spot in the area around the vehicle, wherein the blind spot is not represented in any of pieces of environmental data respectively generated by the environmental sensors;

selecting, from the environmental sensors, an environmental sensor generating environmental data that can be omitted in detection of the object, based on a travel condition of the vehicle;

requesting blind spot data representing the blind spot from an external device equipped with an external sensor capable of generating the blind spot data, the external device being communicably connected to the vehicle; and stopping detection of the object from environmental data generated by the selected environmental sensor, when the blind spot data is obtained from the external device, wherein in detection of the object, an object in the blind spot is detected from the obtained blind spot data when the blind spot data is obtained from the external device.

* * * * *